US008854561B2

(12) United States Patent
Liao et al.

(10) Patent No.: US 8,854,561 B2
(45) Date of Patent: Oct. 7, 2014

(54) LIQUID CRYSTAL DISPLAY PANEL WITH CHARGE SHARING SCHEME

(75) Inventors: Pei-Chun Liao, Hsinchu (TW);
Tien-Lun Ting, Hsinchu (TW);
Wen-Hao Hsu, Hsinchu (TW);
Hung-Lung Hou, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 946 days.

(21) Appl. No.: 12/590,765

(22) Filed: Nov. 13, 2009

(65) Prior Publication Data
US 2011/0115998 A1   May 19, 2011

(51) Int. Cl.
*G02F 1/1343* (2006.01)
*G02F 1/136* (2006.01)
*G09G 3/36* (2006.01)
*G02F 1/1362* (2006.01)
*G02F 1/1337* (2006.01)

(52) U.S. Cl.
CPC ...... *G09G 3/3648* (2013.01); *G09G 2300/0852* (2013.01); *G09G 2320/028* (2013.01); *G09G 2300/0443* (2013.01); *G09G 3/3659* (2013.01); *G02F 1/133707* (2013.01); *G09G 2310/0251* (2013.01); *G09G 2310/0205* (2013.01); *G09G 2300/0447* (2013.01); *G02F 1/13624* (2013.01); *G02F 1/136213* (2013.01)
USPC ............... 349/38; 349/48; 349/139; 349/144; 345/93; 345/99

(58) Field of Classification Search
USPC ................ 349/37, 48, 38, 39, 139, 144, 187; 345/92–94, 98–100, 208
See application file for complete search history.

(56) References Cited

U.S. PATENT DOCUMENTS

| 8,368,826 | B2 * | 2/2013 | Kim et al. ........................ 349/38 |
| 2006/0290827 | A1 | 12/2006 | Kihara et al. |
| 2007/0097057 | A1 | 5/2007 | Shin ................................ 345/98 |
| 2007/0183218 | A1 | 8/2007 | Lee et al. ................. 365/185.26 |
| 2008/0231580 | A1 | 9/2008 | Hsu ................................ 345/98 |
| 2008/0246038 | A1 | 10/2008 | Um et al. ........................ 257/72 |
| 2008/0303768 | A1 | 12/2008 | Do et al. ......................... 345/90 |
| 2009/0027325 | A1 | 1/2009 | Kim et al. ....................... 345/92 |
| 2009/0027581 | A1 | 1/2009 | You et al. ........................ 349/48 |
| 2009/0174698 | A1 | 7/2009 | Kida et al. .................... 345/212 |
| 2010/0007594 | A1 | 1/2010 | Lai et al. ......................... 345/98 |

FOREIGN PATENT DOCUMENTS

CN    101510414 A    8/2009

\* cited by examiner

*Primary Examiner* — Lucy Chien
*Assistant Examiner* — Paisley L Arendt

(57) ABSTRACT

A LCD panel in which a pixel has a first sub-pixel area and a second sub-pixel area, each area having a storage capacitor. Each pixel has a first gate line for providing a first gate-line signal for charging the first and second storage capacitors, and a second gate line for providing a second gate-line signal for removing part of the charges in the second storage capacitor to a third capacitor after the first gate-line signal has passed. The width of the first and second gate-line signals and their timing can be varied so that the first gate-line signal provided to a row can be used as the second gate-line signal to one of the preceding rows. In some embodiments, a pixel in each row has a duplicate pixel arranged to similarly receive the first and second gate-line signals, but data signals are received from different data lines.

21 Claims, 15 Drawing Sheets

Gi = charging gate line
Gix = sharing gate line c = charging
s = charge-sharing

LIQUID CRYSTAL DISPLAY PANEL WITH CHARGE SHARING SCHEME

FIELD OF THE INVENTION

The present invention relates generally to a liquid crystal display (LCD) panel and, more particularly, to a method for driving rows of pixels in an LCD panel.

BACKGROUND OF THE INVENTION

A typical liquid crystal display (LCD) panel has a plurality of pixels arranged in a two-dimensional array, driven by a data driver and a gate driver. As shown in FIG. 1, the LCD pixels 10 in a LCD panel 1 are arranged in rows and columns in a display area 100. A data driver 290 is used to provide a signal indicative of data to each of the columns and a gate driver 300 is used to provide a gate line signal to each of the rows. In a color LCD panel, an image is generally presented in three colors: red (R), green (G) and blue (B). Each of the pixels 10 is typically divided into three color sub-pixels: red sub-pixel 20R, green sub-pixel 20G and blue sub-pixel 20B, as shown in FIG. 2. A data line 221 is used to provide the data signal to the R sub-pixel in a column, a data line 222 is used to provide the data signal to the S sub-pixel in the same pixel column, and a data line 223 is used to provide the data signal to the B sub-pixel in the same pixel column. The data line 224 is used to provide the data signal to the R sub-pixel in the next pixel column. A gate line 231 is used to provide the gate line signal to all sub-pixels in a row and a gate line 232 is used to provide the gate line signal to all sub-pixels in the next row. In a transflective LCD panel, each of the color sub-pixels may be further divided into a transmissive area and a reflective area.

A typical LCD panel is fabricated with two substrates. As shown in FIG. 3, the LCD panel has an upper substrate 12 and a lower substrate 18 and a liquid crystal layer disposed between the substrates. On the upper substrate 12, a transparent, electrically conducting layer 14 is provided as a common electrode. In each of the color sub-pixels 20, an electrically conducting layer 16 is disposed on the lower substrate 18 as a pixel electrode. The LCD panel also comprises an electronic component layer 17 for controlling the voltage between the common electrode and the pixel electrode. The common electrode is usually connected to a common ground or a common voltage source COM.

SUMMARY OF THE INVENTION

The present invention provides a liquid crystal display comprising a plurality of pixels arranged in a plurality of rows and columns, wherein each of some or all of pixels comprises a first sub-pixel area and a second sub-pixel area, each of the first and second sub-pixel areas having a storage capacitor. Each pixel has a first gate line for providing a first gate line signal for charging the first and second storage capacitors, and a second gate line for providing a second gate line signal for removing part of the charges in the second storage capacitor to a third capacitor. The first and second gate line signals have the same width, but the width and the timing between the gate line signals can be varied so that the first gate line signal provided to a row can be used as the second gate line signal to one of the preceding rows. In some embodiments of the present invention, a pixel in each row have a duplicate pixel which is arranged to similarly receive the first and second gate line signals, but the pixel and its duplicate pixel receive data signals from different data lines.

Thus, the first aspect of the present invention is a liquid crystal display panel comprising:
a plurality of pixels arranged in a plurality of rows and columns; and
a plurality of data lines, each for providing data signals to the pixels in a column, herein each of some or all of the pixels comprises:
  a first gate line for providing a first gate-line signal;
  a second gate line for providing a second gate-line signal after the first gate-line signal has passed;
  a first sub-pixel area; and
  a second sub-pixel area, wherein
  the first sub-pixel area comprises a first sub-pixel electrode electrically connected to a first charge-storage capacitor, the first sub-pixel electrode arranged to receive the data signals from one of the data lines via a first switching element, the first switching element comprising a control end arranged to receive the first gate-line signal for switching; and
  the second sub-pixel area comprises a second sub-pixel electrode electrically connected to a second charge-storage capacitor, the second sub-pixel electrode arranged to receive said data signals from said one of the data lines via a second switching element, the second switching element comprising a control end arranged to receive the first gate-line signal for switching, wherein the second sub-pixel electrode is further connected to a third capacitor via a third switching element, the third switching element comprising a control end arranged to receive the second gate-line signal for switching.

The first charge-storage capacitor can be connected to the third capacitor via a fourth capacitor.

In various embodiments of the present invention, the first gate-line signal provided to the pixels in the second row and the first gate-line signal provided to the pixels in the first row have an overlapped period.

In some embodiments of the present invention, the second gate-line signal provided to the pixels in the first row and the first gate-line signal provided to the pixels in the second row have an overlapped period. The first gate-line signal provided to the pixels in the third row and the second gate-line signal provided to the pixels in the first row are substantially the same. The first gate-line signal provided to the pixels in the fourth row and the second gate-line signal provided to the pixels in the first row are substantially the same.

In some embodiments of the present invention, each pixel further comprises:
  a third sub-pixel area and a fourth sub-pixel area, wherein the third sub-pixel area comprises a third sub-pixel electrode electrically connected to a fourth charge-storage capacitor, the third sub-pixel electrode arranged to receive data signals from a different one of the data lines via a fourth switching element, the fourth switching element comprising a control end arranged to receive the first gate-line signal for switching; and
  the fourth sub-pixel area comprises a fourth sub-pixel electrode electrically connected to a fifth charge-storage capacitor, the fourth sub-pixel electrode arranged to receive the data signals from said different one of the data lines via a fifth switching element, the fifth switching element comprising a control end arranged to receive the first gate-line signal for switching, and wherein the fourth sub-pixel electrode is further connected to a sixth capacitor via a sixth switching element, the sixth switching element comprising a control end arranged to receive the second gate-line signal for switching.

The control end of the fifth switching element is arranged to receive the first gate-line signal from a third gate line, and the control end of the sixth switching element is arranged to receive the second gate-line signal from a fourth gate line. The first gate-line signal is provided to the pixels in the second row after the first gate-line signal provided to the pixels in the first row has passed.

A second aspect of the present invention is a method for used in a liquid crystal display panel, the display panel comprising:

a plurality of pixels arranged in a plurality of rows and columns; and a plurality of data lines, each for providing data signals to the pixels in a column, wherein each of some or all of the pixels comprises:

a first gate line;

a first sub-pixel area comprising a first sub-pixel electrode electrically connected to a first charge-storage capacitor; and a second sub-pixel area comprising a second sub-pixel electrode electrically connected to a second charge-storage capacitor, said method comprising:

arranging a second gate line in said each pixel;

providing a first gate-line signal via the first gate line for charging the first charge-storage capacitor and the second charge-storage capacitor; and providing a second gate-line signal via the second gate line for removing part of electrical charge in the second charge-storage capacitor, wherein the second gate-line signal is provided after the first gate-line signal has passed.

The first sub-pixel electrode is arranged to receive the data signals from one of the data lines via a first switching element, the first switching element comprising a control end arranged to receive the first gate-line signal for said charging the first charge-storage capacitor, and the second sub-pixel electrode is arranged to receive said data signals from said one of the data lines via a second switching element, the second switching element comprising a control end arranged to receive the first gate-line signal for said charging the second charge-storage capacitor, said method further comprising:

connecting the second sub-pixel electrode to the third capacitor via a third switching element, the third switching element comprising a control end arranged to receive the second gate-line signal for said removing part of the electrical charge in the second charge-storage capacitor to the third capacitor.

In some embodiments of the present invention, each pixel further comprises:

a third sub-pixel area and a fourth sub-pixel area, wherein
  the third sub-pixel area comprises a third sub-pixel electrode electrically connected to a fourth charge-storage capacitor, the third sub-pixel electrode arranged to receive data signals from a different one of the data lines via a fourth switching element, the fourth switching element comprising a control end; and
  the fourth sub-pixel area comprises a fourth sub-pixel electrode electrically connected to a fifth charge-storage capacitor, the fourth sub-pixel electrode arranged
  to receive the data signals from said different one of the data lines via a fifth
  switching element, the fifth switching element comprising a control end, said method further comprising:
  connecting the fifth charge-storage capacitor to a sixth capacitor via a sixth switching element, the sixth switching element comprising a control end;
  providing the first gate-line signal to the control end of the fourth switching element and to the control end of the fifth switching element for charging the fourth charge-storage capacitor and fifth charge-storage capacitor;
  providing the second gate-line signal to the control end of the sixth switching element for moving part of the electrical charge in the fifth charge-storage capacitor to the sixth capacitor.

In some embodiments of the present invention, each pixel further comprises:

a third gate line arranged to provide the first gate-line signal to the control end of the fourth switching element and to the control end of the fifth switching element; and a fourth gate line arranged to provide the second gate-line signal to the control end of the sixth capacitor. The method further comprises:

directing the first gate-line signal provided to the pixels in the second row or the third row to the second gate line in the pixels in the first row.

The present invention will become apparent upon reading the description taken in conjunction with FIGS. 4-18.

DETAILED DESCRIPTION OF THE INVENTION

Figure 4:
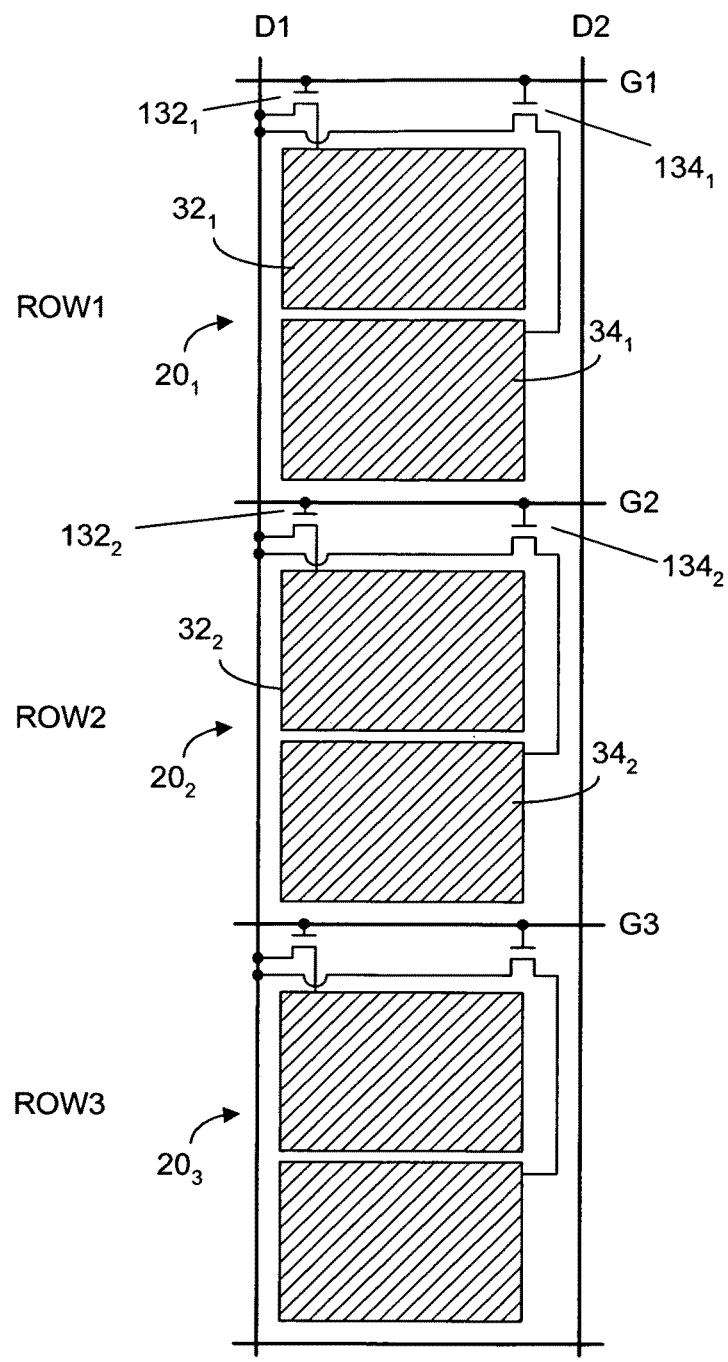
FIG. 4 shows the sub-pixel electrodes in a pixel or color sub-pixel in a LCD panel, according to the present invention.

In various embodiments of the present invention, a pixel or color sub-pixel of a liquid crystal display (LCD) panel comprises two areas, each area comprising an area electrode, together with a common electrode, for controlling the alignment of the liquid crystal layer in the respective area. For simplicity, the term sub-pixel will be used to represent a pixel or a color sub-pixel. As shown in FIG. 4, the sub-pixel $20_1$ includes a first sub-pixel electrode $32_1$ to define a first sub-pixel area and a second sub-pixel electrode $34_1$ to define a second sub-pixel area. The sub-pixel $20_2$ includes a first sub-pixel electrode $32_2$ to define a first sub-pixel area and a second sub-pixel electrode $34_2$ to define a second sub-pixel area. The sub-pixel $20_3$ and other sub-pixels may have similar first and second sub-pixel electrodes. The sub-pixels in a column share a data line, and the sub-pixels in a row share a gate line. As shown in FIG. 4, the sub-pixels $20_1$, $20_2$, $20_3$, ... share a data line D1, and the sub-pixels in the next column (not shown) share a different data line D2. The sub-pixel $20_1$ and other sub-pixels on the same row share a gate line G1; the sub-pixel $20_2$ and other sub-pixels on the same row share a gate line G2; and the sub-pixel $20_3$ and other sub-pixels on the same row share a gate line G3.

The first sub-pixel electrode $32_1$ of the sub-pixel $20_1$ is connected to the data line D1 through a first switching element $132_1$ and the second sub-pixel electrode $34_1$ is connected to the data line D1 through a second switching element $134_1$. The control end of the first and second switching elements $132_1$ and $134_1$ is connected to the gate line G1. The first sub-pixel electrode $32_2$ of the sub-pixel $20_2$ is connected to the data line D1 through a first switching element $132_2$ and the second sub-pixel electrode $34_2$ is connected to the data line D1 through a second switching element $134_2$. The control end of the first and second switching elements $132_2$ and $134_2$ is connected to the gate line G2.

Figure 3:
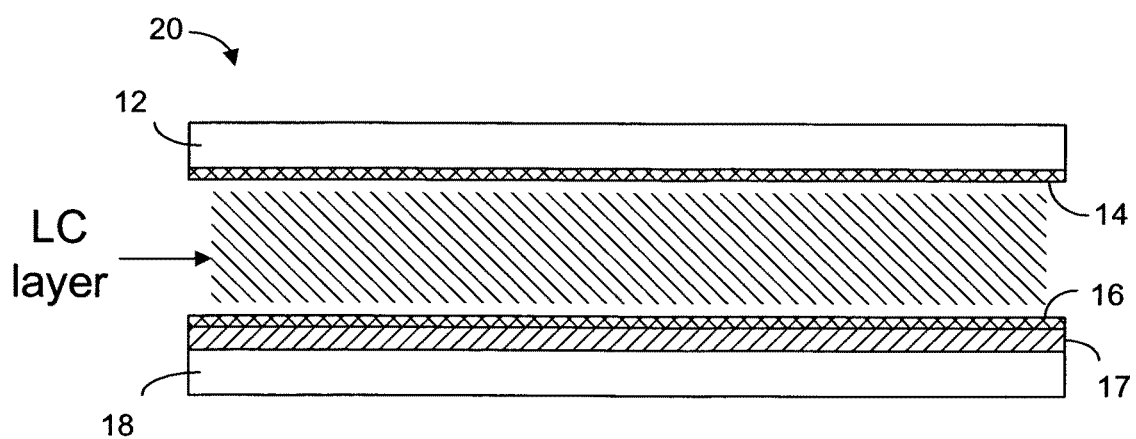
FIG. 3 shows a cross sectional view of a pixel or color sub-pixel in a typical LCD panel.
Figure 5:
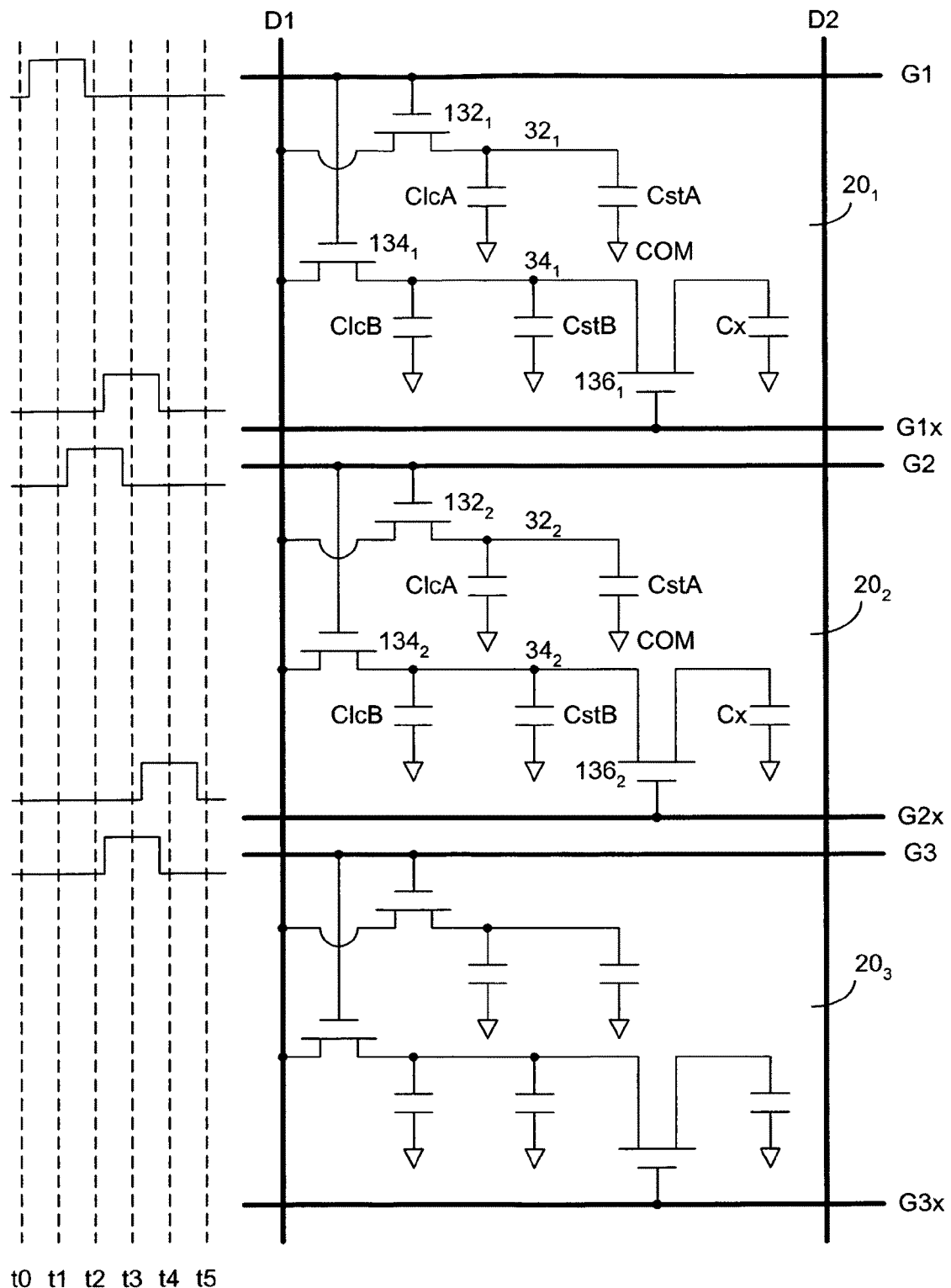
FIG. 5 shows an equivalent circuit of the pixel or color sub-pixel, according to one embodiment of the present invention.

The first sub-pixel electrode $32_1$ and the common electrode (COM, see FIG. 3) form a capacitor ClcA and the second sub-pixel electrode $34_1$ and the common electrode form a capacitor ClcB, as shown in FIG. 5. Furthermore, the first sub-pixel electrode $32_1$ is connected to a storage capacitor CstA and the second sub-pixel electrode $34_1$ is connected to a storage capacitor CstB. Likewise, the first sub-pixel electrode $32_2$ and the common electrode form a capacitor ClcA, and the second sub-pixel electrode $34_2$ and the common electrode form a capacitor ClcB. The first sub-pixel electrode $32_2$ is connected to a storage capacitor CstA and the second sub-pixel electrode $34_2$ is connected to a storage capacitor CstB.

As shown in FIG. 5, the second sub-pixel electrode $34_1$ is further connected to another capacitor Cx through a switching element $136_1$. The second sub-pixel electrode $34_2$ is further connected to another capacitor Cx through a switching element $136_2$. Likewise, the second sub-pixel electrode in each sub-pixel is also connected to a capacitor Cx through a switching element.
The control end of the switching element $136_1$ is connected to an additional gate line G1x, the control end of the switching element $136_2$ is connected to an additional gate line G2x, and so forth.

It is understood that a display panel, such as an LCD panel, is arranged to present an image on a frame-by-frame basis. For each frame, a series of gate line signals is provided to the LCD panel to activate the sub-pixels on one row at a time, for example. As shown in FIG. 5, the gate line signal on gate line G1 is provided between t0 and t2, the gate line signal on gate line G2 is provided between t1 and t3, and the gate line signal on gate line G3 is provided between t2 and t4, for example. As such, the gate line signals provided on adjacent rows or gate lines are partially overlapped.

According to one embodiment of the present invention, in each of the sub-pixels, the capacitors ClcA, CstA, ClcB and CstB are charged at the same time by the data signal on a data line D when the switching elements $132_i$ and $134_i$ are turned on during a gate-line signal on a gate line G1. Thus, the capacitors ClcA, CstA, ClcB and CstB in the sub-pixel $20_1$ are charged during t0 and t2, for example. After the charging of the capacitors ClcA, CstA, ClcB and CstB is completed, part of the charge on the capacitors ClcB and CstB will be shared to the connected capacitor Cx during a signal on the additional gate line. As a result, the voltage potential on the second sub-pixel electrode $34_i$ is lower than that on the first sub-pixel electrode $32_i$. Since the sub-pixel intensity is mainly determined by the voltage between the pixel electrode and the common electrode, the sub-pixel intensity in the second sub-pixel area will change as a result of charge-sharing.

As shown in FIG. 5, charging on sub-pixel $20_1$ on the first row is performed between t0 and t2 by gate-line signal on G1; charging on sub-pixel $20_2$ on the second row is performed between t1 and t3 by gate-line signal on G2; and charging on sub-pixel $20_3$ is performed between t2 and t4 by gate-line signal on G3. Charge-sharing on sub-pixel $20_1$ on the first row is performed between t2 and t4 by a signal on G1x; charge-sharing on sub-pixel $20_2$ on the second row is performed between t3 and t5 by a signal on G2x; and charge-sharing on sub-pixel $20_3$ is performed between t4 and t6 (not shown) by a signal on G3x. Thus, the gate-line signal on G3 can be provided to G1x for charge-sharing on sub-pixel $20_1$, the gate-line signal on G4 can be provided to G2x for charge-sharing on sub-pixel $20_2$, and the gate-line signal on Gi+2 can be provided to Gix for charge-sharing on sub-pixel $20_i$ with i=1, 2, 3 ....

Figure 6:
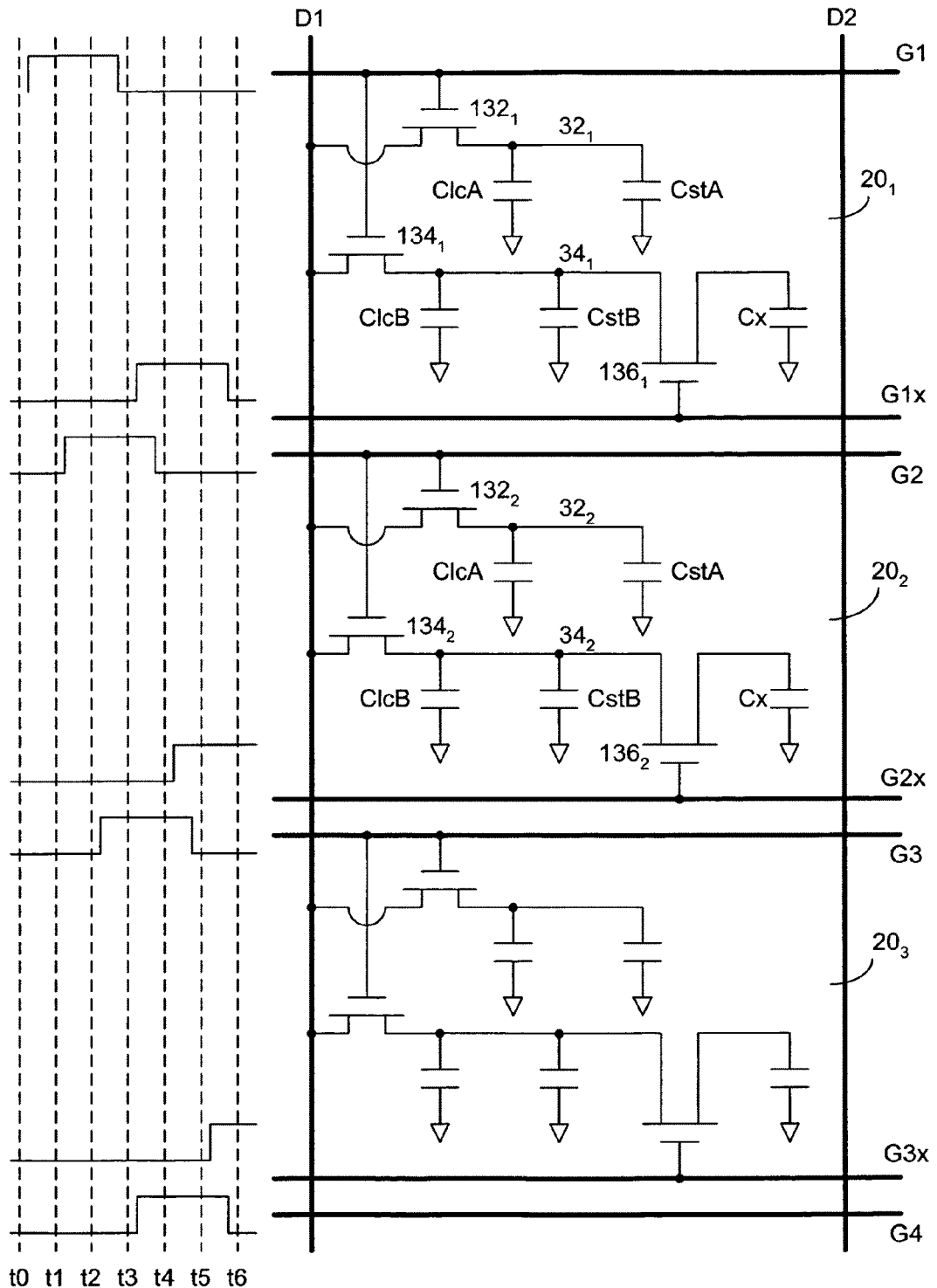
FIG. 6 shows the gate line pulse width, according to another embodiment of the present invention.

In a different embodiment, charging on sub-pixel $20_1$ on the first row is performed between t0 and t3 by gate-line signal on G1; charging on sub-pixel $20_2$ on the second row is performed between t1 and t4 by gate-line signal on G2; charging on sub-pixel $20_3$ is performed between t2 and t5 by gate-line signal on G3, and charging on sub-pixel $20_4$ (not shown) is performed between t3 and t6 by gate-line signal on G4, as shown in FIG. 6. Charge-sharing on sub-pixel $20_1$ on the first row is performed between t3 and t6 by a signal on G1x; and charge-sharing on sub-pixel $20_2$ on the second row is performed between t4 and t7 (not shown) by a signal on G2x. Thus, the gate-line signal on G4 can be provided to G1x for charge-sharing on sub-pixel $20_1$, and the gate-line signal on Gi+3 can be provided to Gix for charge-sharing on sub-pixel $20_i$.

Figure 7:
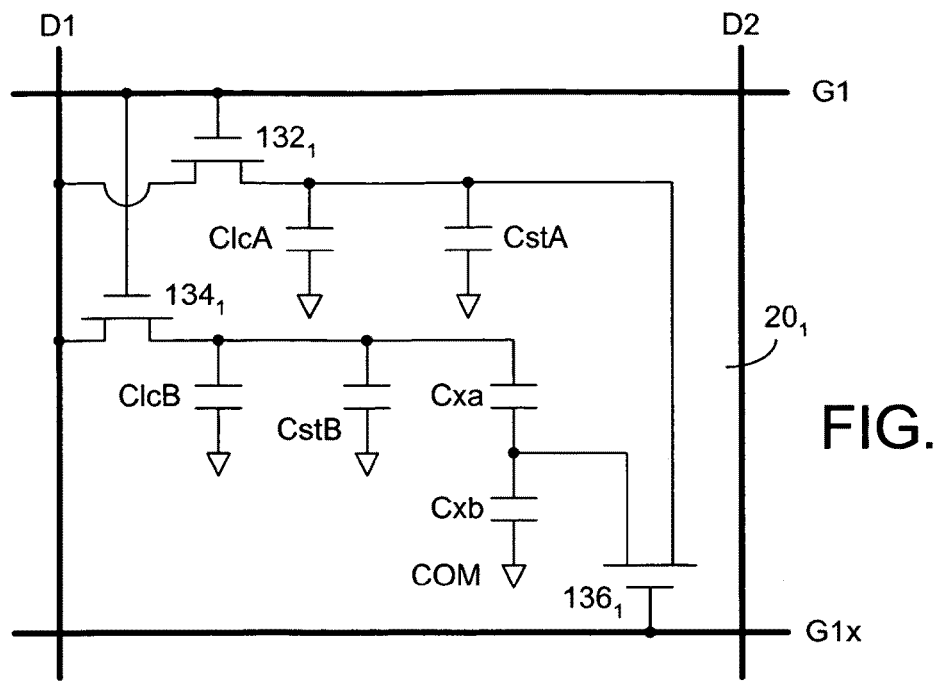
FIG. 7 shows an equivalent circuit of the pixel or color sub-pixel, according to a different embodiment of the present invention.

In a different capacitor arrangement, according to the present invention, charge-sharing is achieved by two capacitors Cxa and Cxb connected in series. As shown in FIG. 7, the first sub-pixel electrode $32_1$ is connected to capacitor Cxb through a switching element $136_1$. The second sub-pixel electrode $34_2$ is connected to capacitor Cxb through capacitor Cxa. As with the embodiment as shown in FIGS. 5 and 6, the control end of the switching element $136_1$ is connected to an additional gate line G1x, and so forth.

Figure 8A:
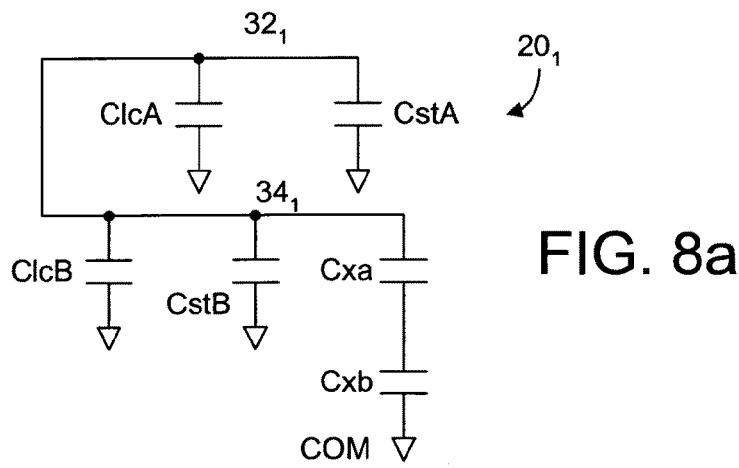
FIG. 8a shows the connection between the sub-pixel electrodes during the charging stage.
Figure 8B:
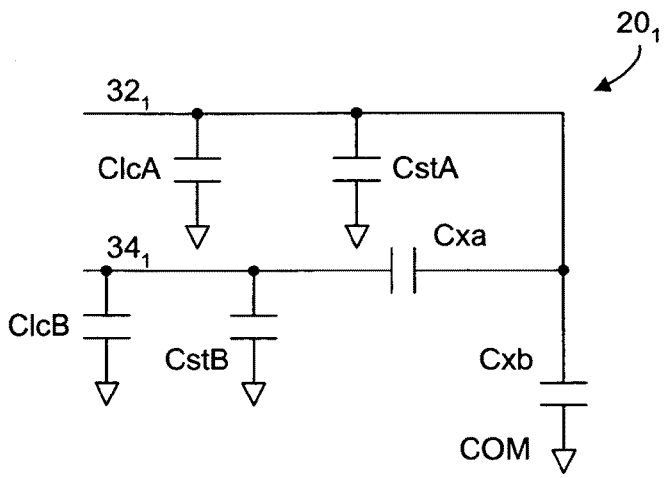
FIG. 8b shows the relationship between the sub-pixel electrodes during the charge-sharing stage.

According to one embodiment of the present invention, in each of the sub-pixels, the capacitors ClcA, CstA, ClcB, CstB, Cxa and Cxb are charged at the same time by the data signal on a data line D when the switching elements $132_i$ and $134_i$ are turned on during a gate line signal on a gate line G1. Thus, the first sub-pixel electrode $32_1$ and the second sub-pixel electrode $34_1$ are charged substantially to the same voltage potential relative to COM, as shown in FIG. 8a. In the charge-sharing period, the signal on G1x causes part of the charge on the capacitors ClcA and CstA to be shared to capacitor Cxb, as shown in FIG. 8b. As a result, the voltage potential on the first sub-pixel electrode $32_1$ is lower than the second sub-pixel electrode $34_1$.

During a frame time, the voltage potential on both the first sub-pixel electrode $32_i$ and second sub-pixel electrode $34_i$ in a sub-pixel are substantially the same only in a charging period. After the charge-sharing period, the voltage potential on one of the sub-pixel electrodes $32_i$ and $34_i$ is lower than the other. As a result, the tilt direction of the liquid-crystal molecules under one of the sub-pixel electrodes is slightly different from that under the other sub-pixel electrode in the same sub-pixel. The slight spread in the tilt direction of the liquid-crystal molecules within a sub-pixel may broaden the viewing angles of a liquid-crystal display panel.

Figure 9:
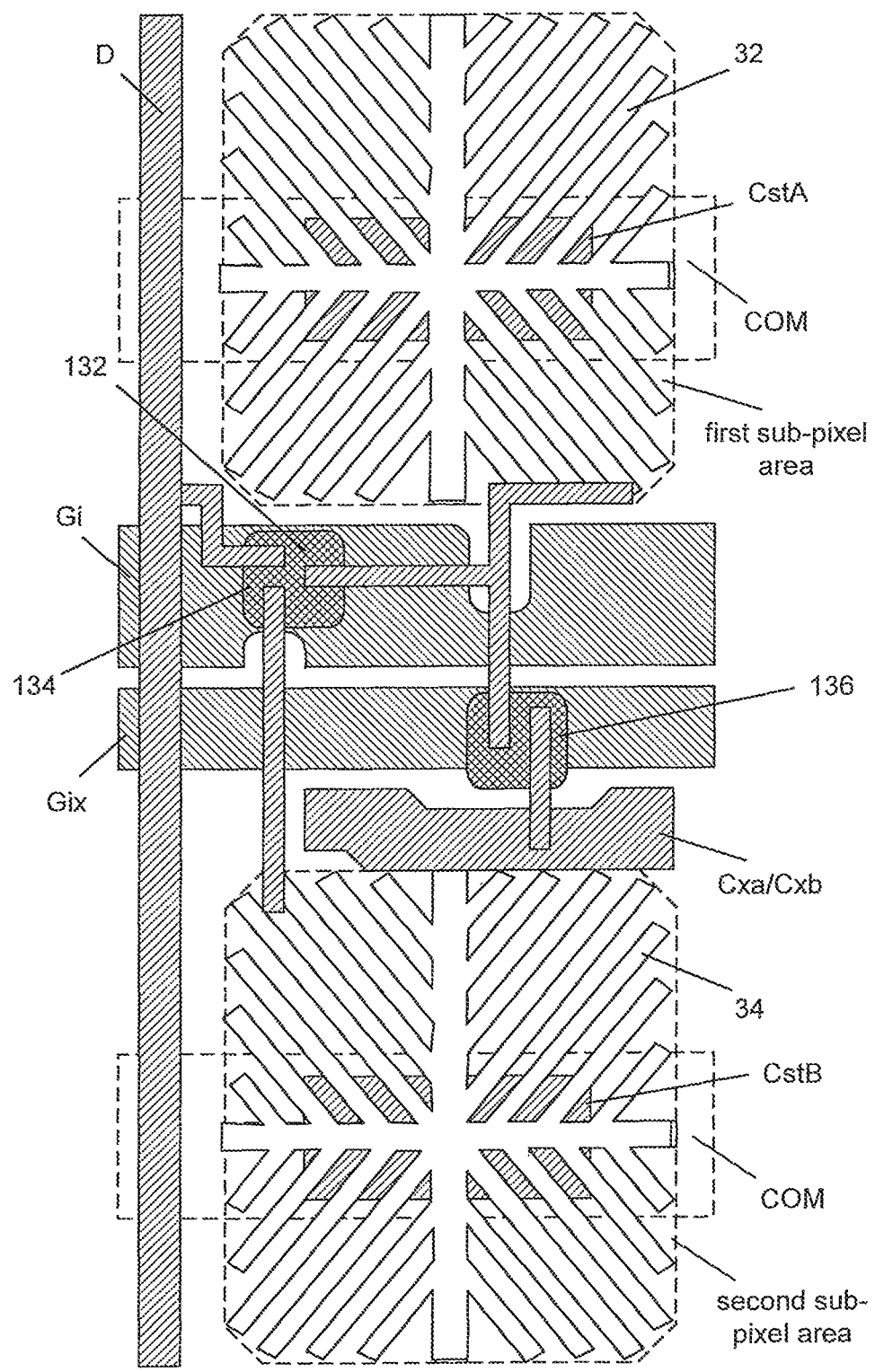
FIG. 9 is a schematic representation showing the component layout in a pixel or color sub-pixel, according to one embodiment of the present invention.

The present invention can be applied to a polymer stabilized alignment (PSA) LCD panel, for example. In general, a sub-pixel in a PSA LCD panel comprises two sub-pixel electrodes separately located in two substantially rectangular sub-pixel areas (see U.S. Patent Application No. 2008/0036931, which is incorporated here by reference). Each of the sub-pixel electrodes is generally divided into four segments, each having a fin-like pattern branched out from the center of the sub-pixel electrode. As such, the liquid-crystal molecules under each sub-pixel electrode form four domains. The storage capacitor associated with each of the sub-pixel electrodes can be located near the center of the sub-pixel electrode, for example. An exemplary component layout of a pixel or color-sub-pixel, according to one embodiment of the present invention, is shown in FIG. 9. As shown in FIG. 9, the sub-pixel electrode $32_1$ and the sub-pixel electrode $34_1$ are separated by a control section. The control section comprises two gate lines G1 and G1x, separately connected to TFTs $132_1$, $134_1$ and $136_1$. The charge-sharing capacitors Cxa/Cxb are fabricated at the proximity of TFT $136_1$ and sub-pixel $34_1$. The control section also comprises metal lines to serve as gate lines and common lines.

Figure 10:
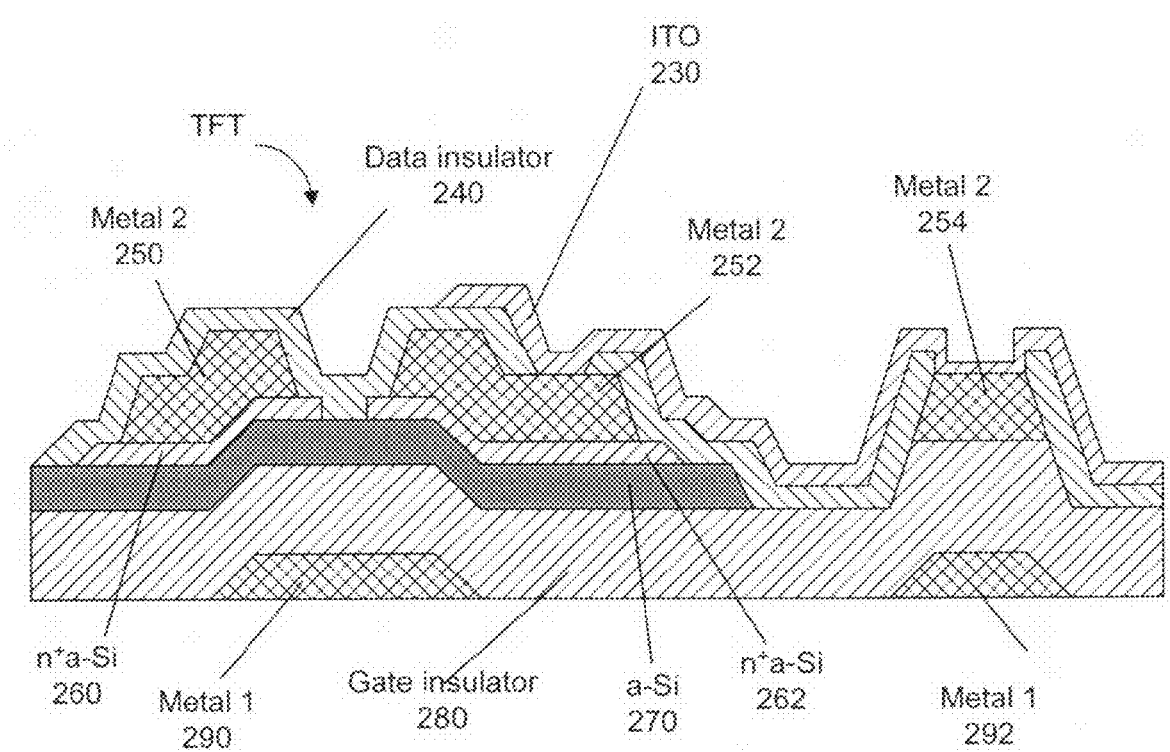
FIG. 10 is a cross sectional view of a pixel or color sub-pixel, according to one embodiment of the present invention.

A cross sectional view of a sub-pixel, according to one embodiment of the present invention, is schematically shown in FIG. 10. As shown in FIG. 10, the cross section comprises a number of metal lines (Metal 1) or sections 290, 292 to serve as gate lines and common lines. For example, the metal line 290 is used as a gate terminal of a TFT ($132_i$ or $134_i$ of FIG. 6), whereas the metal line 292 is used as a common line. An insulator layer 280 is used as a gate insulator between the metal line 290 and a gate terminal layer 270 (made of a-Si, for example). On top of the a-Si layer 270 are a source terminal 250 and a drain terminal 252 (Metal 2) of the TFT, separated from the gate terminal layer 270 by two n⁺ a-Si sections 260, 262. A data insulator 240 is disposed on top of the TFT and part of the insulator layer 280. A segment 254 of the Metal 2 layer is used to form a storage capacitor with the metal section 292. An ITO layer 230 is disposed on part of the data insulator 240, in electrical contact with the drain terminal 254 and the Metal 2 segment 254.

Figure 11:
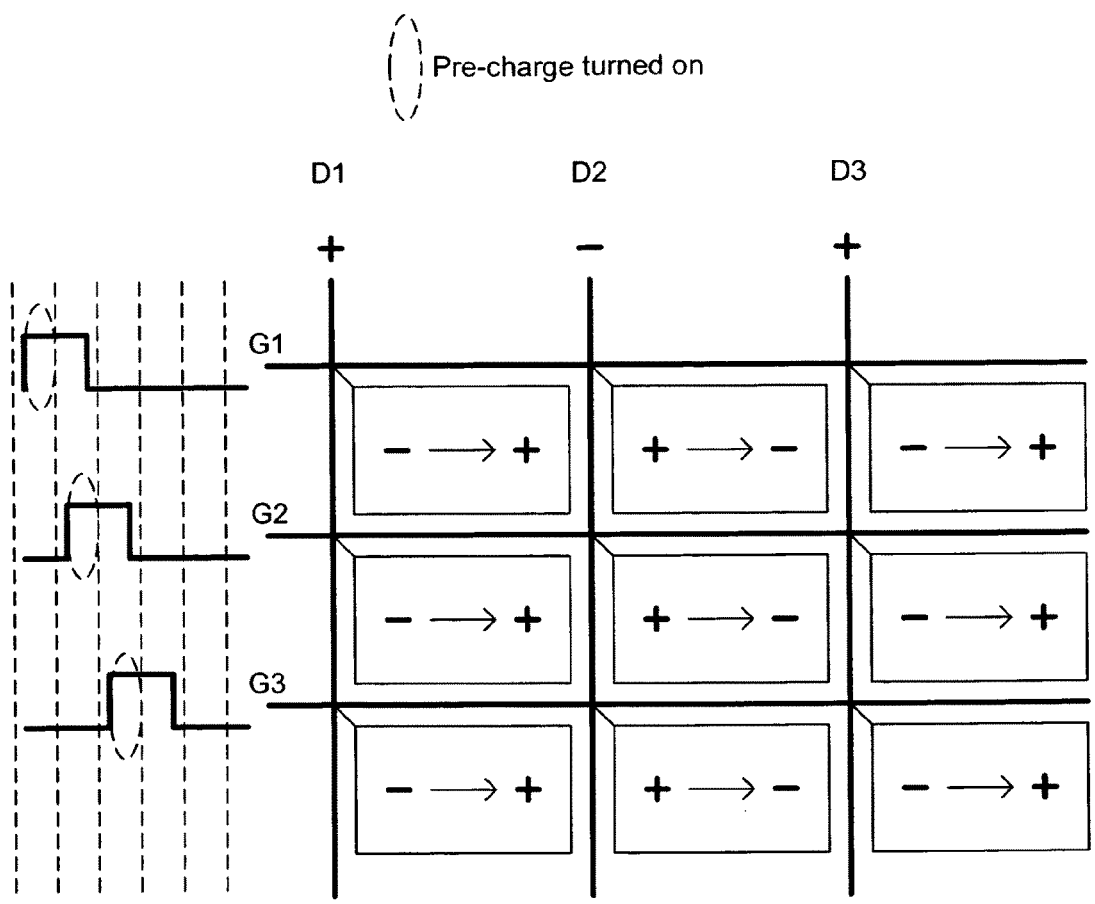
FIG. 11 is a timing diagram showing a pre-charge procedure, according to one embodiment of the present invention.

In a high frame-rate or high-resolution LCD display, in order to increase the charging time, a pre-charge scheme is used. In a LCD display wherein the gate line signal on a gate line does not start until the gate line signal on the immediately preceding gate line has passed, the pre-charge signal is usually separated from and preceding a "select" pulse for selecting a sub-pixel. If a sub-pixel is activated by charging the sub-pixel electrode and its associated storage capacitor from a minimum level to a maximum level, the pre-charge signal is used to charge a sub-pixel from the minimum level to an intermediate level. The "select" pulse is then used to charge the sub-pixel to its maximum level. In the present invention, the gate line signal on G1 is partially overlapped with the gate line signal on G2 as shown in FIG. 5. The non-overlapping part of the gate line signal on G1 can be used in a pre-charge procedure in a LCD display with column inversion where the data line polarity on each column is the same within a frame. The pre-charging scheme on a LCD display with column inversion is shown in FIG. 11.

Figure 12:
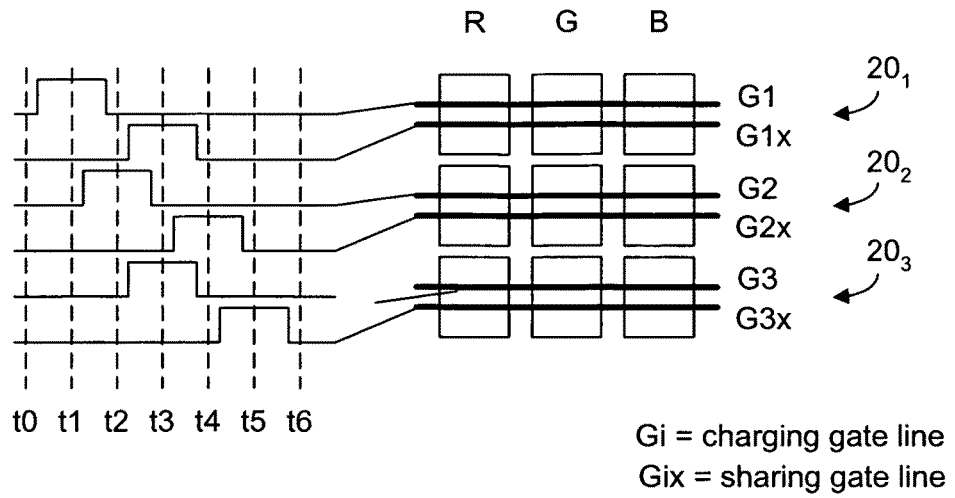
FIG. 12 is a schematic representation of a charging and charge-sharing scheme as illustrated in FIG. 5.

The charging and charge-sharing scheme, as depicted in FIG. 5, uses a charging gate line Gi for charging and a separate charge-sharing gate line Gix for charge-sharing in a pixel $20_i$ on the ith row. In general, a pixel comprises three color pixels R, G and B. A schematic representation of that charging and charge-sharing scheme is shown in FIG. 12. As shown in FIGS. 5 and 12, the gate-line signal width is twice as broad as the gate pulse width (GPW) of a conventional LCD display so that the gate-line signals provided on adjacent rows are partially overlapped while the gate-signals provided on the charging gate line and the charge-sharing gate line for the pixels on the same row are separated. The charging and charge-sharing scheme can be used in an LCD driven at a 120 Hz frequency, or a frame rate of 120 frames per second.

As shown in FIG. 12, each row of pixels has two gate lines. The gate line G1 is for charging and the gate line Gix is for charge-sharing. The gate-line signals for charging provided on adjacent rows are partially overlapped, whereas the gate-signals provided on the charging gate line and on the charge-sharing gate line for the pixels on the same row are separated. As can be seen from FIG. 12, the charging gate line signal provided on G3 is the same as the charge-sharing gate line signal provided on G1x. Thus, it is possible to direct the gate-line signal provided on G3 to gate line G1x. Similarly, it is possible to direct the gate-line signal provided on G(n+2) to gate line Gnx.

An advantage of having two gate lines for each row of pixels is that the capacitor Cx for sharing the charge from the capacitors ClcB and CstB can be located in the same sub-pixel as shown in FIGS. 5 and 6. The charge-sharing conductor—the conductor between CstB and the switching element 136—can be entirely located in the same sub-pixel. Likewise, the capacitor Cxb for sharing the charge from ClcA and CstA can be located in the same sub-pixel as shown in FIG. 7. The charge-sharing conductor—the conductor between CstA and the switching element 136—can be entirely located in the same sub-pixel. In the embodiment as shown in FIG. 5, the gate line signal width is substantially twice as broad as the gate pulse width (GPW) of a conventional LCD display. In the embodiment as shown in FIG. 6, the gate line signal width is substantially three times as broad as the GPW of a conventional LCD display.

If each row of pixels has only one gate line and gate pulse width is greater than the GPW of a conventional LCD display, the charge-sharing conductor must cross the sub-pixels in adjacent rows. This cross charge-sharing scheme would make the pixel layout more complicated and cause an undesirable effect of pixel-to-pixel coupling.

Furthermore, as discussed in conjunction with FIG. 11, the timing requirement for pre-charge is that the gate-line signals on adjacent rows of pixels are partially overlapping. However, the timing requirement for charging and charge-sharing is that the charge-sharing is carried only after the charging in the same row is completed. Thus, there would be a trade-off between pre-charge and charge-sharing when only one gate-line is used for providing signals on each row of pixels.

With two gate lines for each row of pixels, both the timing requirement for pre-charge and the timing requirement for charge-sharing can be fulfilled.

Figure 13:
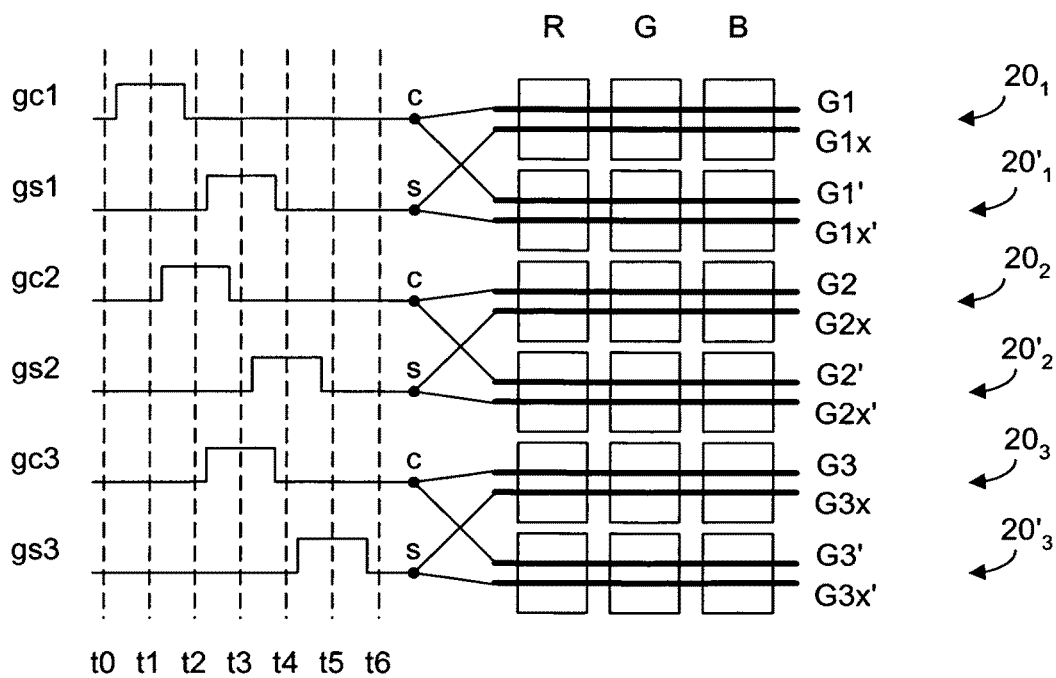
FIG. 13 is a schematic representation of another charging and charge-sharing scheme, according to the present invention.

A similar charging and charge-sharing scheme can also be used in a 240 Hz LCD panel based on a half-gate two-data (hG-2D) technology. As shown in FIG. 13, each row of pixels is effectively split into an upper row and a lower row. For example, the pixel row $20_1$ driven by charging gate line G1 and charge-sharing gate line G1x now has a duplicate pixel row $20'_1$ driven by charging gate line G1' and charge-sharing gate line G1x'. In the hG-2D driving scheme, the gate line signals on charging gate lines G1 and G1' are simultaneously provided to the pixel rows $20_1$ and $20'_1$, but the data signal to the pixel row $20_1$ associated with G1 and the data signal to the pixel row $20'_1$ associated with G1' are separately provided on two data lines (not shown). Likewise, the gate line signals on charge-sharing gate lines G1x and G1x' are simultaneously provided. The gate line signal for charging in the pixels on both pixel row $20_i$ and pixel row $20'_i$ is denoted by gci. The gate line signal for charge sharing in the pixels on both pixel row $20_i$ and pixel row $20'_i$ is denoted by gsi.

Figure 18:
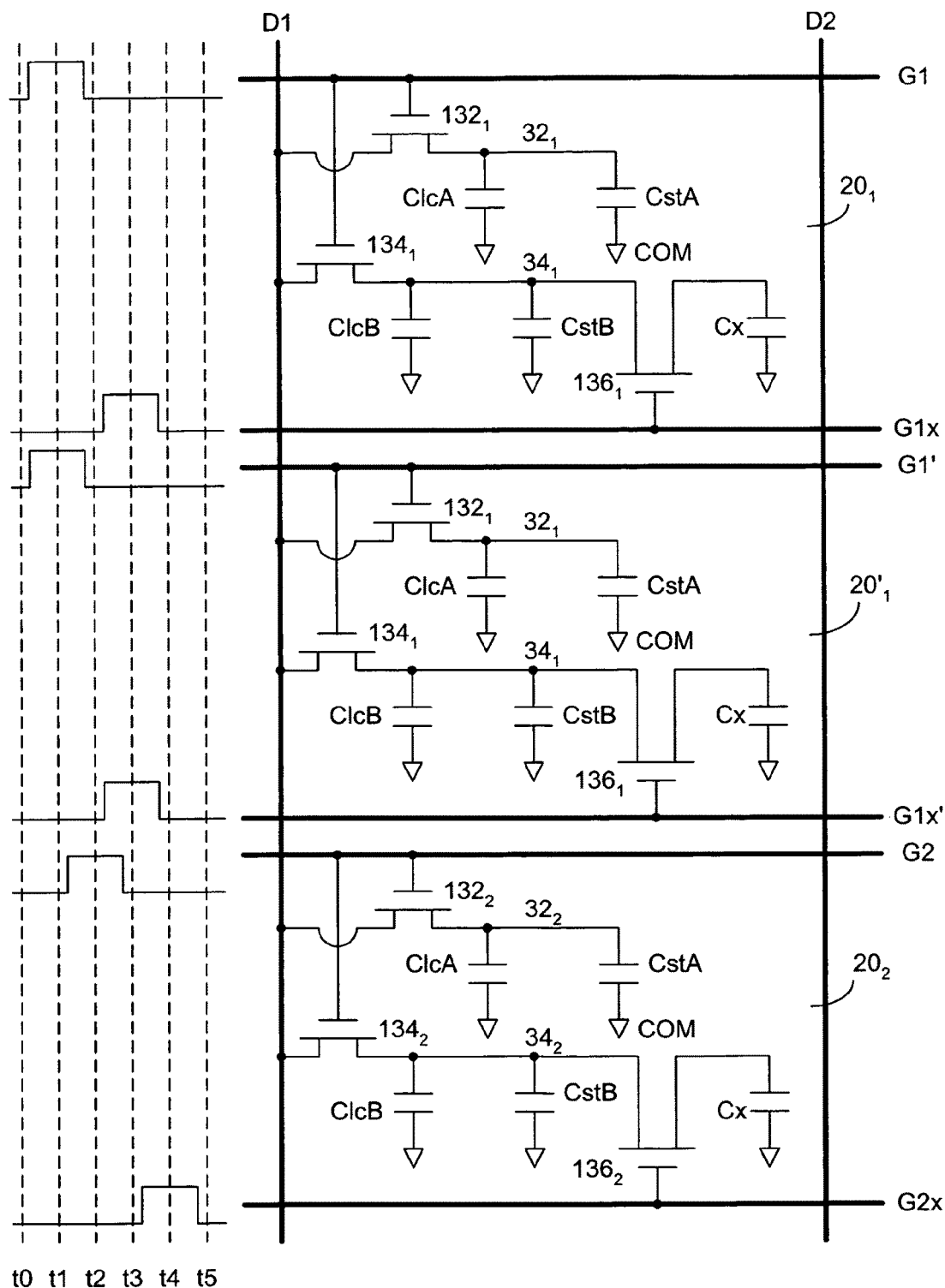
FIG. 18 shows repeating rows in an hG-2D LCD display.

In the embodiment as shown in FIG. 13, each pair of related pixel rows $20_i$ and $20'_i$ has its own charging gate-signal gci and charge-sharing gate signal gsi. Accordingly, in a frame time, there will be n charging gate-signals and n charge-sharing gate signals for n pairs of related pixel rows. It is possible to eliminate the n charge-sharing gate-signals by using the charging gate signals for charge-sharing. An equivalent circuit of the pixel rows in an hG-2D LCD display is shown in FIG. 18.

Figure 14:
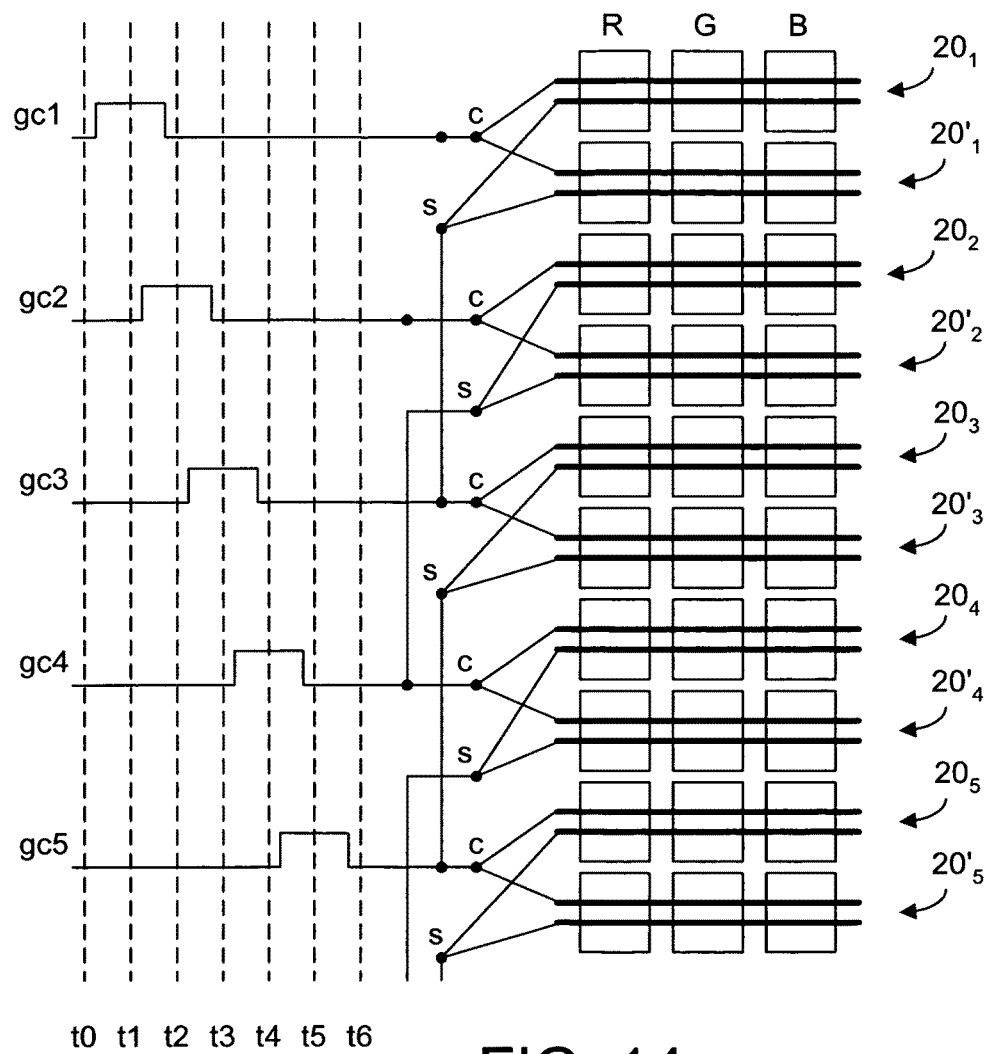
FIG. 14 is a schematic representation of yet another charging and charge-sharing scheme, according to the present invention.

As shown in FIG. 14, a charging gate-signal gc3, for example, can be simultaneously used for charging in the pixels on pixel row $20_3$ and $20'_3$ and for charge-sharing in the pixels on pixel row $20_1$ and $20'_1$. Likewise, a charging gate-signal gc4 can be simultaneously used for charging in the pixels on pixel row $20_4$ and $20'_4$ and for charge-sharing in the pixels on pixel row $20_2$ and $20'_2$. In this embodiment, the gate-line signal width is twice the gate pulse width (GPW) and the charging gate-signals "jump" over two pairs of rows to do the charge-sharing.

Figure 15A:
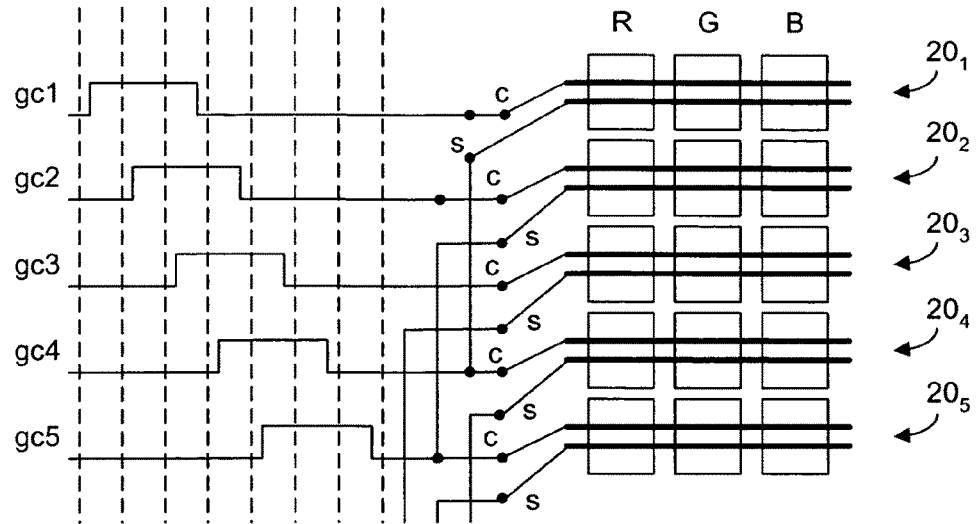
FIG. 15a is a schematic representation of a different charging and charge-sharing scheme, according to the present invention.

If the gate-line signals are further broadened as shown in FIG. 6, the charging gate-signals "jump" over three or more pairs to carry out the charge sharing. As shown in FIG. 15a, a charging gate-signal gc4, for example, can be simultaneously used for charging in the pixels on pixel row $20_4$ and for charge-sharing in the pixels on pixel row $20_1$. Likewise, a charging gate-signal gc5 can be simultaneously used for charging in the pixels on pixel row $20_5$ and for charge-sharing in the pixels on pixel row $20_2$. In this embodiment, the gate-line signal width is three times the gate pulse width (GPW) and the charging gate-signals "jump" over three pairs of rows to do the charge-sharing.

Figure 15B:
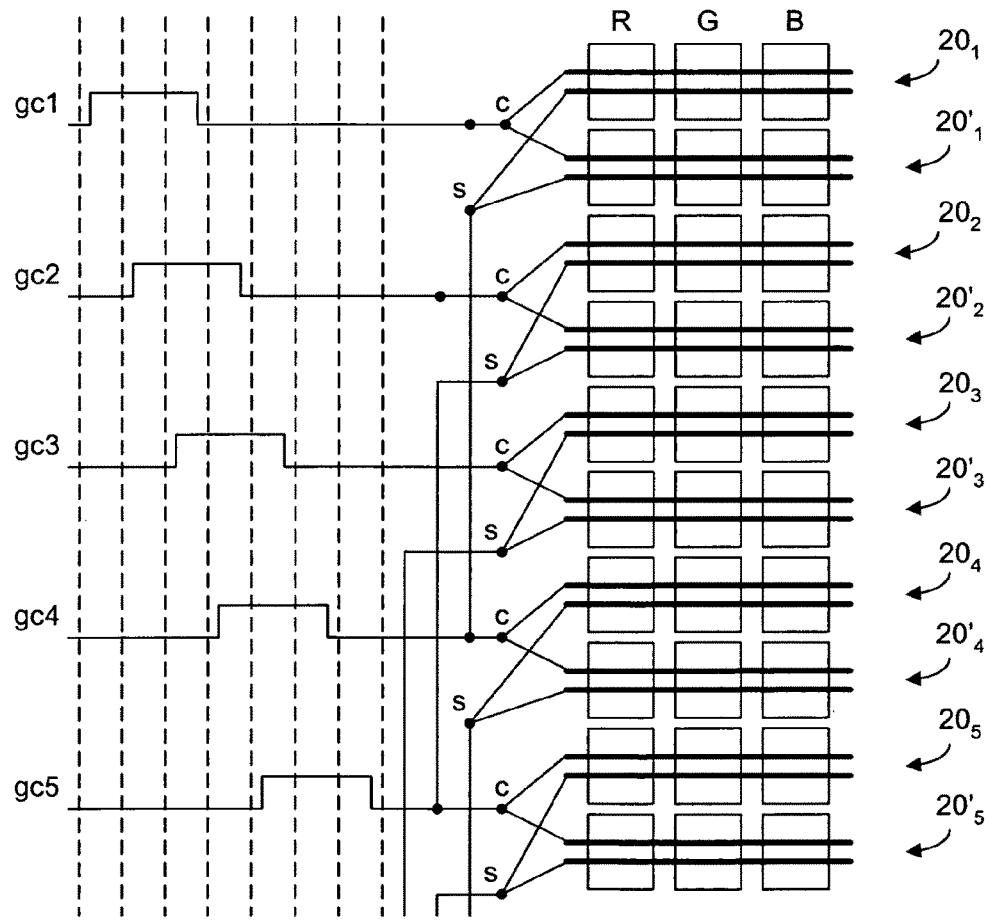
FIG. 15b is a schematic representation of another different charging and charge-sharing scheme, according to the present invention.

A similar charging and charge-sharing scheme can also be used in a 240 Hz LCD panel based on the hG-2D technology. As shown in FIG. 15b, a charging gate-signal gc4, for example, can be simultaneously used for charging in the pixels on pixel row $20_4$ and $20'_4$ and for charge-sharing in the pixels on pixel row $20_1$ and $20'_1$. Likewise, a charging gate-signal gc5 can be simultaneously used for charging in the pixels on pixel row $20_5$ and $20'_5$ and for charge-sharing in the pixels on pixel row $20_2$ and $20'_2$. In this embodiment, the gate-line signal width is three times the gate pulse width (GPW) and the charging gate-signals "jump" over three pairs of rows to do the charge-sharing.

Figure 16:
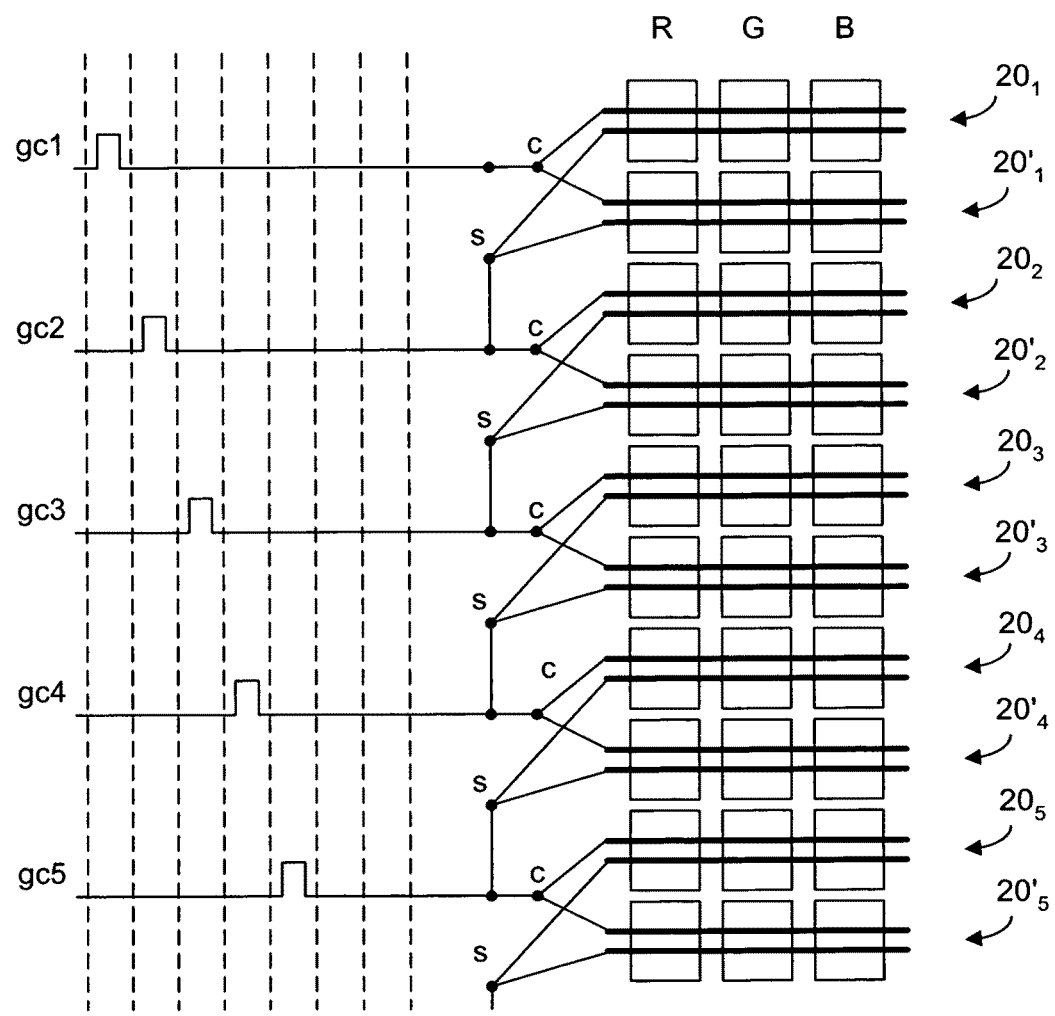
FIG. 16 is a schematic representation of yet another charging and charge-sharing scheme, according to the present invention.

If the gate-line signal width is equal to the gate-pulse width (GPW), the charging gate-signals can only jump to the preceding pair of rows to do the charge-sharing. As shown in FIG. 16, a charging gate-signal gc4, for example, can be simultaneously used for charging in the pixels on pixel row $20_4$ and $20'_4$ and for charge-sharing in the pixels on pixel row $20_3$ and $20'_3$. Likewise, a charging gate-signal gc5 can be simultaneously used for charging in the pixels on pixel row $20_5$ and $20'_5$ and for charge-sharing in the pixels on pixel row $20_4$ and $20'_4$.

In summary, the present invention uses a regular gate-pulse width or a wider gate-pulse width to achieve various embodiments. With a regular gate-pulse width (GPW), a gate-signal can be used to simultaneously carry out charging in the pixels on a pair n of duplicate pixel rows and charge-sharing in the pixels on a preceding pair n-1 of duplicate pixel rows in a 240 Hz display using hG-2D technology, wherein the data signals to the duplicate pixel rows are separately provided by two data lines.

With a double gate-pulse with (2×GPW), a gate signal can be used to simultaneously carry out charging in the pixels on a pixel row n and charge-sharing in the pixels on a different pixel row n-2 a 120 Hz display. Furthermore, such a gate signal can be used to simultaneously carry out charging in the pixels on a pair n of duplicate pixel row and charge-sharing in the pixels on a different pair n-2 of duplicate pixel rows in a 240 Hz display using hG-2D technology wherein the data signals to the duplicate pixel rows are separately provided by two data lines.

With a triple gate-pulse width (3×GPW), a gate signal can be used to simultaneously carry out charging in the pixels on a pixel row n and charge-sharing in the pixels on a different pixel row n-3 a 120 Hz display. Furthermore, such a gate signal can be used to simultaneously carry out charging in the pixels on a pair n of duplicate pixel row and charge-sharing in the pixels on a different pair n-3 of duplicate pixel rows in a 240 Hz display using hG-2D technology wherein the data signals to the duplicate pixel rows are separately provided by two data lines.

It is also possible to use a gate-line signal having a pulse width broader than three times the regular GPW and the timing between charging and charge-sharing in the pixels on the same row will be adjusted accordingly.

Figure 17:
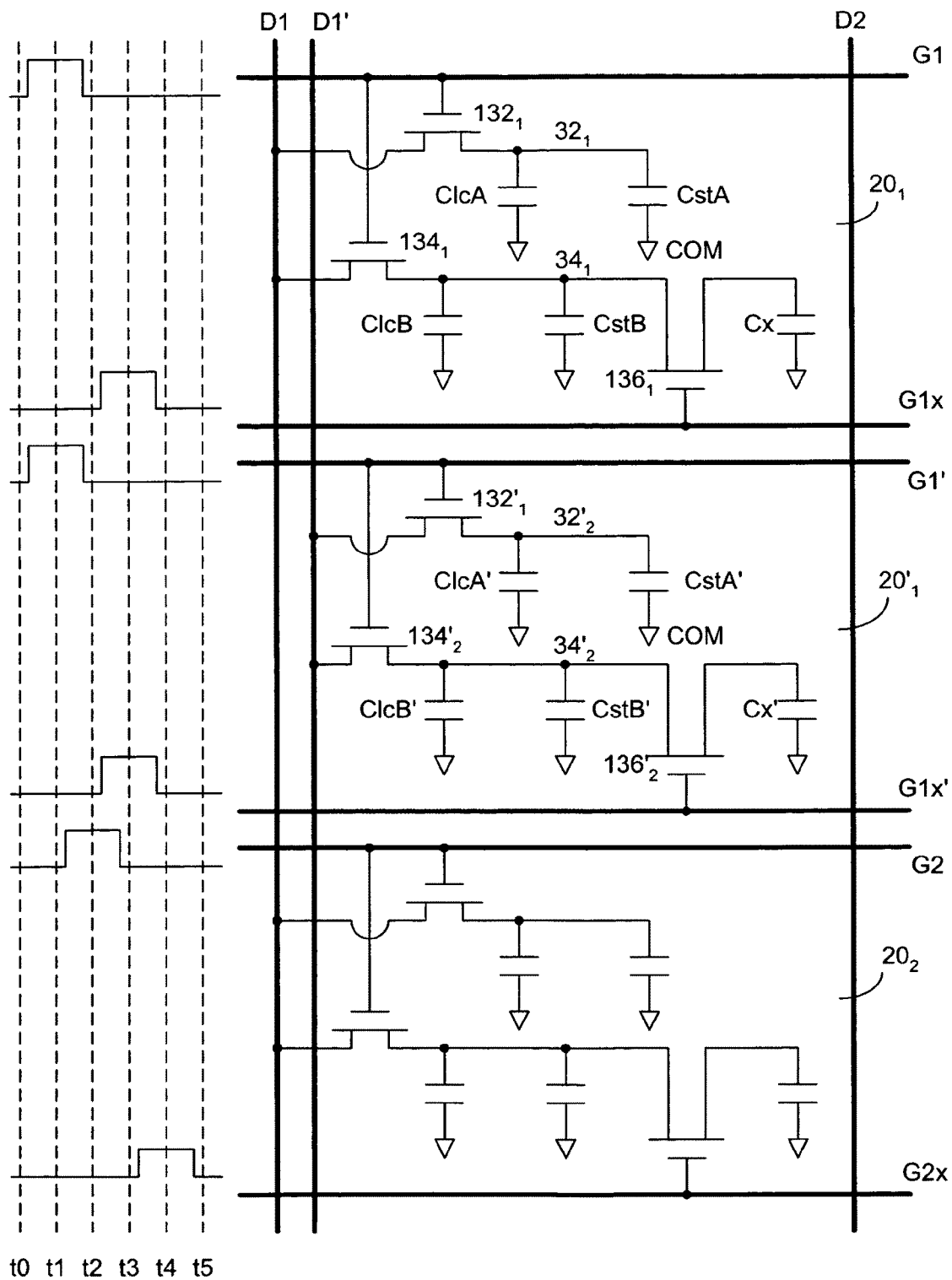
FIG. 17 shows an equivalent circuit of color sub-pixels, according to one embodiment of the present invention.

The pixels $20'_i$ in the repeated rows as shown in FIGS. 13-16 can be identical to the pixels $20_i$. Thus, the pixel $20_1$ and the pixel $20'_1$ as shown in FIG. 17 can have substantially the same components except that the switching elements $132_1$, $134_1$ in pixel $20_1$ are arranged to received the data signals from data line D1, whereas the switching elements $132'_1$, $134'_1$ in pixel $20'_1$ are arranged to receive the data signals from a different data line D1'.

Figure 1:
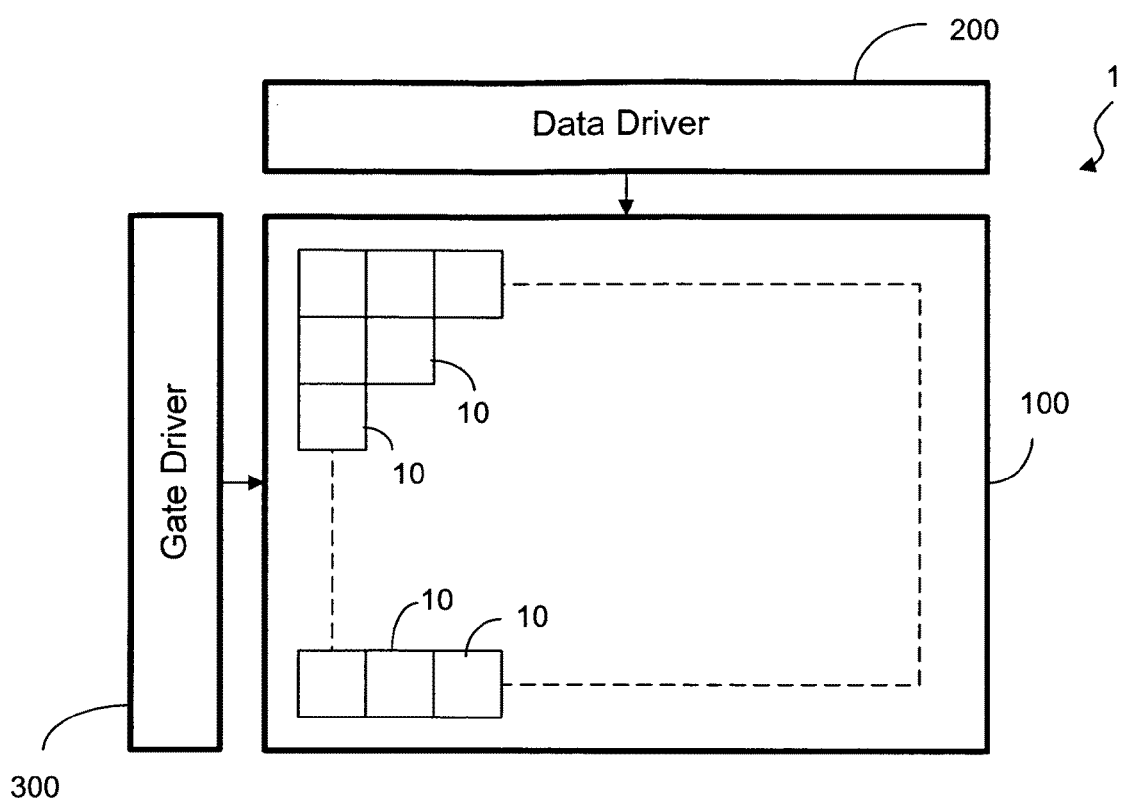
FIG. 1 shows a typical LCD panel.
Figure 2:
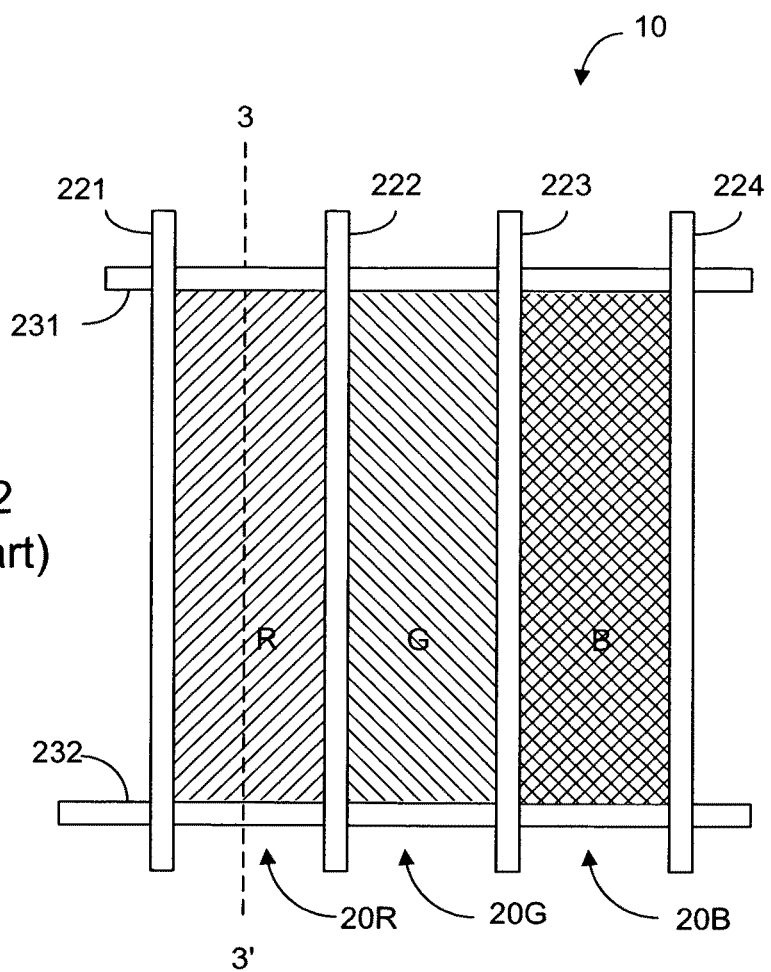
FIG. 2 shows three color sub-pixels in a pixel in a typical LCD panel.

In a conventional LCD display, the color sub-pixels R, G, B in each pixel are arranged in a row as shown in FIG. 2. As shown in FIG. 2, each color sub-pixel has its own data line. In a Tri-gate LCD display, the color sub-pixels R, G, B for each pixel are arranged in a column, and each color sub-pixel has its own gate line. There will be three gate lines per pixel row. In a half-source driver (HSD) type LCD display, the color sub-pixels R, G, B in each pixel are arranged in a row, similar to the conventional LCD display, but the R, G, B data lines for the sub-pixels are grouped into pairs such that one of the data lines in each pixel is moved to the other side of the sub-pixel. As the data line is moved to the other side of the sub-pixel, it leaves a space or empty area between two adjacent color sub-pixels. That area can be used for the layout of the charge-sharing conductors. As such, it would not be necessary to reduce the width of the sub-pixel electrodes in order to implement the charge-sharing conductors. For the above reasons, the present invention can be used in a HSD type LCD display without sacrificing the aperture ratio (AR) of a pixel.

In a Polymer Stabilized Alignment (PSA) type LCD display, the charging gate lines Gi and charge-sharing gate lines Gix can be implemented in a non-overlapping and non-crossing design (see FIG. 9, for example). In FIG. 9, the gate line Gi is substantially parallel to the gate line Gix and they are arranged in a space between the first sub-pixel area and the second sub-pixel area.

The various embodiments of the present invention can also be used in a FHD type LCD display with a 1920×1080 resolution, a 4k2k type display with a 3840×2160 resolution.

It should be noted that, the various embodiments of the present invention can be used in a color sub-pixel in a color LCD display, but they can also be used in a pixel of a monochromic LCD display. The LCD display can be a transmissive display, for example. The invention can also be used in a transflective display or a reflective display.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A liquid crystal display panel comprising:
   a plurality of pixels arranged in a plurality of rows and columns; and
   a plurality of data lines, each for providing data signals to the pixels in a column, wherein each of some or all of the pixels comprises:
   a first gate line and a second gate line different from the first gate line, the first gate line for providing a first gate-line signal;
   the second gate line for providing a second gate-line signal after the first gate-line signal has passed, the second gate-line signal different from the first gate-line signal;
   a first sub-pixel area; and
   a second sub-pixel area, wherein
      the first sub-pixel area comprises a first sub-pixel electrode electrically connected to a first charge-storage capacitor, the first sub-pixel electrode arranged to receive the data signals from one of the data lines via a first switching element, the first switching element comprising a control end arranged to receive the first gate-line signal for switching; and
      the second sub-pixel area comprises a second sub-pixel electrode electrically connected to a second charge-storage capacitor, the second sub-pixel electrode arranged to receive said data signals from said one of the data lines via a second switching element, the second switching element comprising a control end arranged to receive the first gate-line signal for switching, wherein the second sub-pixel electrode is further connected to a third capacitor via a third switching element, the third switching element comprising a control end arranged to receive the second gate-line signal for switching, wherein the plurality of rows comprise a first row and a second row, and wherein the first gate-line signal is provided to the pixels in the second row for switching in the pixels in the second row after the first gate-line signal is provided to the pixels in the first row for switching in the pixels in the first row, and the second gate-line signal is provided to the pixels in the first row for switching in the pixels in the first row after the first gate-line signal is provided to the pixels in the second row for switching in the pixels in the second row, such that the first gate-line signal provided to the pixels in the second row and the first gate-line signal provided to the pixels in the first row have an overlapped period and non-overlapped periods.

2. The liquid crystal display panel according to claim 1, wherein the third switching element comprises a first switching end and a second switching end, the first switching end connected to the second sub-pixel electrode, the second switching end connected to the third capacitor, the third capacitor comprising a first end connected to the third switching element and an opposing second end electrically disconnected from the first sub-pixel electrode, and wherein the first charge-storage capacitor is further connected to the third capacitor via a fourth capacitor, the fourth capacitor having a first end connected to the first sub-pixel electrode and an opposing second end connected to the first end of the third capacitor for charging the third capacitor when the first gate-line signal is provided to the pixels in the first row.

3. The liquid crystal display panel according to claim 1, wherein the second gate-line signal provided to the pixels in the first row and the first gate-line signal provided to the pixels in the second row have an overlapped period.

4. The liquid crystal display panel according to claim 3, wherein the second gate-line signal provided to the pixels in the first row and the first gate-line signal provided to the pixels in the second row also have non-overlapped periods.

5. The liquid crystal display panel according to claim 1, wherein the plurality of rows comprise a third row following the second row, and wherein the first gate-line signal provided to the pixels in the third row and the second gate-line signal provided to the pixels in the first row are substantially the same.

6. The liquid crystal display panel according to claim 1, wherein the plurality of rows comprise a third row following the second row and a fourth row following the third row, and wherein the first gate-line signal provided to the pixels in the fourth row and the second gate-line signal provided to the pixels in the first row are substantially the same.

7. The liquid crystal display panel according to claim 1, wherein said each pixel further comprises:
   a third sub-pixel area and a fourth sub-pixel area, wherein
      the third sub-pixel area comprises a third sub-pixel electrode electrically connected to a fourth charge-storage capacitor, the third sub-pixel electrode arranged to receive data signals from a different one of the data lines via a fourth switching element, the fourth switching element comprising a control end arranged to receive the first gate-line signal for switching; and
      the fourth sub-pixel area comprises a fourth sub-pixel electrode electrically connected to a fifth charge-storage capacitor, the fourth sub-pixel electrode arranged to receive the data signals from said different one of the data lines via a fifth switching element, the fifth switching element comprising a control end arranged to receive the first gate-line signal for switching, and wherein the fourth sub-pixel electrode is further connected to a sixth capacitor via a sixth switching element, the sixth switching element comprising a control end arranged to receive the second gate-line signal for switching.

8. The liquid crystal display panel according to claim 7, wherein the control end of the fifth switching element is arranged to receive the first gate-line signal from, a third gate line, and the control end of the sixth switching element is arranged to receive the second gate-line signal from a fourth gate line.

9. A method for use in the liquid crystal display panel according to claim 1, the method comprising:
   arranging the second gate line in said each pixel;
   providing the first gate-line signal via the first gate line for charging the first charge-storage capacitor and the second charge-storage capacitor; and providing the second gate-line signal via the second gate line for removing part of electrical charge in the second charge-storage capacitor, wherein the second gate-line signal is provided after the first gate-line signal has passed.

10. The liquid crystal display panel according to claim 1, wherein the second gate-line signal provided to the pixels in the first row and the second gate-line signal provided to the pixels in the second row have an overlapped period and non-overlapped periods.

11. The liquid crystal display panel according to claim 1, wherein
the first charge-storage capacitor has a first capacitor end connected to the first sub-pixel electrode and a second capacitor end connected to a common voltage;
the second charge-storage capacitor has a first capacitor end connected to the second sub-pixel electrode and a second capacitor end connected to the common voltage; and
the third capacitor has a first end connected to the third switching element and a second end connected to the common voltage.

12. The liquid crystal display panel according to claim 1, wherein the second gate line for providing the second gate-line signal to the pixels in the first row is different from the first gate line for providing the first gate-line signal to the pixels in the second row.

13. A method for use in a liquid crystal display panel, the display panel comprising:
a plurality of pixels arranged in a plurality of rows and columns; and
a plurality of data lines, each for providing data signals to the pixels in a column, wherein each of some or all of the pixels comprises:
a first gate line;
a first sub-pixel area comprising a first sub-pixel electrode electrically connected to a first charge-storage capacitor; and
a second sub-pixel area comprising a second sub-pixel electrode electrically connected to a second charge-storage capacitor, wherein
the first sub-pixel electrode is arranged to receive the data signals from one of the data lines via a first switching element, the first switching element comprising a control end arranged to receive a first gate-line signal, and
the second sub-pixel electrode is arranged to receive said data signals from said one of the data lines via a second switching element, the second switching element comprising a control end arranged to receive the first gate-line signal, said method comprising:
arranging a second gate line in said each pixel, the second gate line different from the first gate line;
providing a first gate-line signal via the first gate line for charging the first charge-storage capacitor and the second charge-storage capacitor;
providing a second gate-line signal via the second gate line for removing part of electrical charge in the second charge-storage capacitor, the second gate-line signal different from the first gate-line signal, wherein the second gate-line signal is provided after the first gate-line signal has passed, wherein the plurality of rows comprise a first row and a second row, and wherein the first gate-line signal is provided to the pixels in the second row for switching in the pixels in the second row after the first gate-line signal is provided to the pixels in the first row for switching in the pixels in the first row, and the second gate-line signal is provided to the pixels in the first row for switching in the pixels in the first row after the first gate-line signal is provided to the pixels in the second row for switching in the pixels in the second row, such that the first gate-line signal provided to the pixels in the second row and the first gate-line signal provided to the pixels in the first row have an overlapped period and non-overlapped periods, and
connecting the second sub-pixel electrode to a third capacitor via a third switching element.

14. The method according to claim 13, wherein the third switching element comprises a first switching end connected to the second sub-pixel electrode and a second switching end connected to the third capacitor, the third capacitor comprising a first end connected to the third switching element and an opposing second end electrically disconnected from the first sub-pixel electrode,
the third switching element comprising a control end arranged to receive the second gate-line signal for said removing part of the electrical charge in the second charge-storage capacitor to the third capacitor, and
wherein the first charge-storage capacitor is further connected to the third capacitor via a fourth capacitor, the fourth capacitor having a first end connected to the first sub-pixel electrode and an opposing second end connected to the first end of the third capacitor for charging the third capacitor when the first ante-line signal is provided to the pixels in the first row.

15. The method according to claim 14, wherein the second end of the third capacitor is connected to a common voltage.

16. The method according to claim 13, wherein the second gate-line signal provided to the pixels in the first row and the first gate-line signal provided to the pixels in the second row have an overlapped period.

17. The method according to claim 16, wherein the second gate-line signal provided to the pixels in the first row and the first gate-line signal provided to the pixels in the second row also have non-overlapped periods, and the second gate-line signal provided to the pixels in the first row and the second gate-line signal provided to the pixels in the second row have an overlapped period and non-overlapped periods.

18. The method according to claim 13, wherein the plurality of rows comprise a third row following the second row, and wherein the first gate-line signal provided to the pixels in the third row and the second gate-line signal provided to the pixels in the first row are substantially the same.

19. The method according to claim 13, wherein the plurality of rows comprise a third row following the second row and a fourth row following the third row, and wherein the first gate-line signal provided to the pixels in the fourth row and the second gate-line signal provided to the pixels in the first row are substantially the same.

20. The method according to claim 13, wherein
the first charge-storage capacitor has a first capacitor end connected to the first sub-pixel electrode and a second capacitor end connected to a common voltage; and
the second charge-storage capacitor has a first capacitor end connected to the second sub-pixel electrode and a second capacitor end connected to the common voltage.

21. The method according to claim 13, wherein the second gate line for providing the second gate-line signal to the pixels in the first row is different from the first gate line for providing the first gate-line signal to the pixels in the second row.

* * * * *

UNITED STATES PATENT AND TRADEMARK OFFICE
CERTIFICATE OF CORRECTION

PATENT NO. : 8,854,561 B2  Page 1 of 1
APPLICATION NO. : 12/590765
DATED : October 7, 2014
INVENTOR(S) : Pei-Chun Liao et al.

It is certified that error appears in the above-identified patent and that said Letters Patent is hereby corrected as shown below:

In the Claims,

In column 14 at line 28 (claim 14, line 17), "ante-line" should be --gate-line--.

Signed and Sealed this
Twenty-fourth Day of February, 2015

Michelle K. Lee
*Deputy Director of the United States Patent and Trademark Office*